(12) United States Patent
Shigeta

(10) Patent No.: US 12,254,737 B2
(45) Date of Patent: Mar. 18, 2025

(54) RECOGNITION SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 17/891,723

(22) Filed: Aug. 19, 2022

(65) Prior Publication Data

US 2022/0398891 A1 Dec. 15, 2022

Related U.S. Application Data

(63) Continuation of application No. 16/764,079, filed as application No. PCT/JP2018/039644 on Oct. 25, 2018, now abandoned.

(30) Foreign Application Priority Data

Nov. 15, 2017 (JP) ................................. 2017-219634

(51) Int. Cl.
*G07F 17/34* (2006.01)
*G06F 18/21* (2023.01)
(Continued)

(52) U.S. Cl.
CPC .......... *G07F 17/322* (2013.01); *G06F 18/214* (2023.01); *G06F 18/217* (2023.01);
(Continued)

(58) Field of Classification Search
CPC ............. G07F 17/3206; G07F 17/3211; G07F 17/3225; G07F 17/3237; G07F 17/3239;
(Continued)

(56) References Cited

U.S. PATENT DOCUMENTS 5,941,769 A 8/1999 Order
6,848,994 B1 2/2005 Knust et al.
(Continued)

FOREIGN PATENT DOCUMENTS

CN 101283382 A 10/2008
CN 102479138 A 5/2012
(Continued)

OTHER PUBLICATIONS

Filipino Publication dated Jun. 24, 2019 issued in corresponding PH Application 1-2018-000374.
(Continued)

*Primary Examiner* — Omkar A Deodhar
*Assistant Examiner* — Shauna-Kay Hall
(74) *Attorney, Agent, or Firm* — NORTON ROSE FULBRIGHT US LLP

(57) ABSTRACT

A recognition system of a chip in a game parlor having a game table includes a game recording device which records a state of the chips stacked on the game table as an image using a camera and a chip determination device which analyzes an image of the state of the recorded chips to determine the number and the type of the chips bet by a player. The chip determination device has a function of storing a characteristic of an image of a predetermined state of the chip, and of outputting and displaying, as a determination result, a fact of an unclear determination when the image obtained from the game recording device at the time of determining is the image of the predetermined state.

9 Claims, 5 Drawing Sheets

(51) Int. Cl.
G06F 18/214 (2023.01)
G06N 20/00 (2019.01)
G06T 7/00 (2017.01)
G07F 17/32 (2006.01)

(52) U.S. Cl.
CPC .............. *G06N 20/00* (2019.01); *G06T 7/97* (2017.01); *G07F 17/3206* (2013.01); *G07F 17/3211* (2013.01); *G07F 17/3225* (2013.01); *G07F 17/3237* (2013.01); *G07F 17/3239* (2013.01); *G07F 17/3241* (2013.01); *G07F 17/3293* (2013.01); *G06T 2207/20081* (2013.01)

(58) Field of Classification Search
CPC ............ G07F 17/3241; G07F 17/3293; G06K 9/00624; G06K 9/03; G06K 9/6256
See application file for complete search history.

(56) References Cited

U.S. PATENT DOCUMENTS

| | | | |
|---|---|---|---|
| 7,316,615 | B2 | 1/2008 | Soltys et al. |
| 8,221,244 | B2 | 7/2012 | French |
| 10,872,274 | B2 | 12/2020 | Mao et al. |
| 2003/0062491 | A1* | 4/2003 | Livingston ............... G01V 8/18 250/559.29 |
| 2005/0272501 | A1 | 12/2005 | Tran et al. |
| 2006/0128472 | A1 | 6/2006 | Beavers |
| 2006/0160608 | A1* | 7/2006 | Hill ..................... G07F 17/3293 463/25 |
| 2006/0287068 | A1 | 12/2006 | Walker et al. |
| 2007/0060311 | A1 | 3/2007 | Rowe et al. |
| 2009/0075725 | A1 | 3/2009 | Koyama |
| 2009/0233699 | A1 | 9/2009 | Koyama |
| 2010/0093428 | A1 | 4/2010 | Mattice et al. |
| 2010/0105486 | A1 | 4/2010 | Shigeta |
| 2011/0052049 | A1 | 3/2011 | Rajaraman et al. |
| 2012/0040727 | A1 | 2/2012 | Gururajan et al. |
| 2012/0137180 | A1 | 5/2012 | Shao |
| 2013/0148881 | A1 | 6/2013 | Xue |
| 2013/0296041 | A1 | 11/2013 | Emori et al. |
| 2014/0307958 | A1 | 10/2014 | Wang et al. |
| 2015/0312517 | A1 | 10/2015 | Hoyt et al. |
| 2016/0328604 | A1 | 11/2016 | Bulzacki |
| 2017/0039807 | A1 | 2/2017 | Shigeta |
| 2017/0161987 | A1* | 6/2017 | Bulzacki ............. G07F 17/3211 |
| 2018/0070687 | A1 | 3/2018 | Shigeta |
| 2018/0075698 | A1 | 3/2018 | Shigeta |
| 2018/0211110 | A1 | 7/2018 | Shigeta |
| 2020/0294346 | A1 | 9/2020 | Shigeta |

FOREIGN PATENT DOCUMENTS

| | | |
|---|---|---|
| CN | 102663435 A | 9/2012 |
| CN | 103164713 A | 6/2013 |
| CN | 103870823 A | 6/2014 |
| CN | 103927387 A | 7/2014 |
| CN | 105740751 A | 7/2016 |
| CN | 106408785 A | 2/2017 |
| CN | 106462725 A | 2/2017 |
| CN | 106815323 A | 6/2017 |
| CN | 106909552 A | 6/2017 |
| CN | 109771931 A | 8/2021 |
| GB | 0126424 | 1/2002 |
| GB | 201210538 | 7/2012 |
| JP | 2000137818 A | 5/2000 |
| JP | 2009219588 A | 10/2009 |
| JP | 2012174222 A | 9/2012 |
| JP | 2014-002630 A | 1/2014 |
| JP | 2014-068910 A | 4/2014 |
| JP | 2014079399 A | 5/2014 |
| JP | 2015146075 A | 8/2015 |
| JP | 2016009212 A | 1/2016 |
| JP | 2016-143353 A | 8/2016 |
| JP | 2017-064386 A | 4/2017 |
| JP | 2017-109197 A | 6/2017 |
| JP | 2017-136347 A | 8/2017 |
| KR | 1020140139466 A | 12/2014 |
| WO | 2008/120749 A1 | 10/2008 |
| WO | 2017086413 A1 | 5/2017 |
| WO | 2017167046 A1 | 10/2017 |

OTHER PUBLICATIONS

International Search Report dated Jan. 22, 2019 issued in corresponding PCT Application PCT/JP2018/039644.
Macao Office Action dated Oct. 21, 2019 issued in corresponding MO Application I/1589.
European Search Report dated Apr. 4, 2019 issued in corresponding EP Application 18206219.0.
Chinese Office Action dated May 31, 2021 issued in CN Application 201880073863.8.
Chinese Office Action dated Nov. 3, 2021 issued in CN Application 201811355112.3.
Smoke Foreign Body Elimination System Based on Machine Vision Technology by Zheng Xiao-Zhen et al. published in Machine Building & Automation, vol. 42, No. 4, pp. 157-pp. 159, published on Jun. 2013 (with Abstract in English).
Chinese Office Action dated Jan. 6, 2022 issued in CN Application 201880073863.8.
Le Kang et al., Convolutional Neural Networks for No-Reference Image Quality Assessment, Proceedings of the IEEE conference on computer version and pattern recognition, 2014 (Year 2014) provided by the Computer Vision Foundation.
US Office Action dated Sep. 23, 2022 issued for U.S. Appl. No. 16/188,646.
Filipino Office Action dated Jan. 20, 2023 issued in PH Application 1-2018-000374.
Japanese Office Action dated May 30, 2023 issued in JP Application 2018-202408.
Korean Office Action dated Jun. 2, 2023 issued in KR Application 10-2018-0137555.
Korean Office Action dated Jun. 2, 2023 issued in KR Application 10-2020-7016071.
US Office Action issued on Sep. 22, 2023 for U.S. Appl. No. 16/188,646.
"Introduction to Online Machine Learning: Simplified" by Tavish Srivastava, published on Jan. 27, 2015 on the website, http://www.analyticsvidhya.com/blog/2015/01/introduction-onlinemachine-learning-simplified-2/.
Filipino Office Action dated Apr. 8, 2024 issued in PH Application No. 1-2023-050221.
European Search Report dated Mar. 21, 2024 issued in EP Application No. 18877945.8.
Japanese Office Action dated Oct. 29, 2024 issued in JP Application No. 2023-136897.

* cited by examiner

RECOGNITION SYSTEM

CROSS-REFERENCE TO RELATED APPLICATIONS

This application is a continuation of U.S. patent application Ser. No. 16/764,079 filed May 14, 2020, which is a national phase application under 35 U.S.C. § 371 of International Pat. App. No. PCT/JP2018/039644 filed Oct. 25, 2018, which claims priority to JP Pat. App. No. 2017-219634 filed Nov. 15, 2017; the entire contents of each disclosure is specifically incorporated by reference herein without disclaimer.

BACKGROUND

Technical Field

The present invention relates to a recognition system, and particularly to a recognition system of a chip.

Related Art

In a game such as a baccarat game, a client (player) stacks a plurality of chips on a table to bet. Therefore, the stacked chips are needed to be recognized with accuracy. Further, WO 2008/120749 discloses an example of the chip used in the game.

SUMMARY

An object of the invention is to provide a recognition system which can recognize a plurality of types of targets.

A recognition system of a chip according to a first aspect is a recognition system of a chip in a game parlor where a game table is provided, the system includes: a game recording device which records a state of chips stacked on the game table as an image using a camera; and a chip determination device which analyzes the image of the recorded state of the chips to determine a number and a type of the chips bet by a player, and the chip determination device further has a function of storing a characteristic of an image of a predetermined state of the chip and of outputting and displaying the fact of an unclear determination as a determination result when it is determined that the image obtained from the game recording device is the image of the predetermined state at the time of determining.

According to the aspect, the chip determination device stores an image as an image of a predetermined state which is less accuracy in reading the chip for example. When the image obtained from the game recording device at the time of determining is determined as an image of the predetermined state, the chip determination device outputs and displays the fact of an unclear determination without forcibly outputting an answer. With this configuration, the determination result in a case where an answer is forcibly output with respect to the image having a less accuracy in reading the chip can be excluded from the determination result of the number and the type of the chips (that is, the determination result of a high possibility to be incorrect). In other words, the number and the type of the chips can be determined only from the image which can be correctly read. As a result, it is possible to recognize the chip with accuracy.

A recognition system of a chip according to a second aspect is the recognition system of the chip according to the first aspect, the chip determination device includes an artificial intelligence device, the artificial intelligence device learns a plurality of images used in a past determination in a case where there is an error in determination in the chip determination device as training data, and the chip determination device further has a function of self-determining a determination accuracy on the basis of an image where there is an error in a determination result as a result of the learning, and of outputting and displaying the fact of an unclear determination that there is a doubt in determination as the determination result.

According to the aspect, the artificial intelligence device of the chip determination device learns the plurality of images used in the past (incorrect) determination in a case where there is an error in determination as the training data. Therefore, it is possible to increase the accuracy of the self-determination when the determination accuracy is self-determined. With this configuration, it is possible to reduce a situation that a correctly read image is erroneously determined as unclear to be output and displayed.

A recognition system of a chip according to a third aspect is the recognition system of the chip according to the second aspect, and the chip determination device further has a function of analyzing an image of the game recording device in a case where the self-determination is unclear, determining whether a cause of the unclear determination is a state where the chips stacked on the game table overlap each other or a state where a part of or an entire single chip is hidden by other chips, and stores the cause.

According to the aspect, it is possible for a dealer to easily confirm a cause of the unclear determination from the determination result stored in the chip determination device. With this configuration, the dealer can quickly eliminate the cause of the unclear determination by replacing the chips at positions not shadowing the other chips or by clearly stacking the chips stacked in a zigzag (the dealer may call attention to the player when the player does not like the dealer touch the chips).

A recognition system of a chip according to a fourth aspect is the recognition system of the chip according to any one of the first to third aspects, and the game recording device assigns an index or a time to an image acquired from the camera, or assigns a tag which specifies a stacking state of the chips such that the record of the game can be analyzed subsequently by the chip determination device.

According to the aspect, the chip determination device uses the index, the time, and the tag assigned to the image to easily specify the image of the state of the chip of an analysis target from the recorded content of the game recording device. Thus, it is possible to reduce time required to the specification.

A recognition system of a chip according to a fifth aspect is the recognition system of the chip according to any one of the first to fourth aspects, the chip determination device includes a second artificial intelligence device, and the second artificial intelligence device learns a plurality of images used in a past determination in a case where the chip determination device makes a correct determination and information of the chip as training data.

According to the aspect, the second artificial intelligence device of the chip determination device learns the plurality of images used in the past (correct) determination in a case where the chip determination device makes a correct determination and the information of the chips as the determination result as the training data. Therefore, it is possible to increase the determination accuracy when the number and the type of the chips are determined.

A recognition system of a chip according to a sixth aspect is the recognition system of the chip according to any one of the first to fifth aspects, and the chip determination device analyzes an image recorded by a camera different from the camera in a case where a self-determination is unclear to determine the number and the type of the chips bet by the player.

A recognition system of a chip according to a seventh aspect is the recognition system of the chip according to any one of the first to sixth aspects, and the chip determination device determines that it is the image of the predetermined state in a case where a next chip is recognized while a certain number of chips or more in a vertical direction are not recognized, and outputs and displays the fact of the unclear determination as a determination result.

A recognition system of a chip according to an eighth aspect is the recognition system of the chip according to any one of the first to seventh aspects, and the chip determination device compares a number of chips determined from a height of the chips and a number determined by analyzing an image of a state of the chips, and in a case where the numbers are different, the chip determination device determines that it is the image of the predetermined state, and outputs and displays the fact of an unclear determination as a determination result.

A recognition system according to a ninth aspect is a recognition system which has a plurality of types of determination targets, determines a target for each type to determine a number of the targets for each type, the system includes: a recording device which records a state of the state as an image using a camera; and a determination device including an artificial intelligence device which analyzes the image of the recorded target to determine the number of the types of the targets, and the determination device has learnt a past determination result as training data and has a function of self-determining an accuracy in determination, and a function of self-determining that there is a doubt in a determination result in a case the accuracy is equal to or less than a certain level and of outputting and displaying the fact of an unclear determination as the determination result.

According to the aspect, the determination device learns the past determination result as the training data. With respect to new image, the determination device first self-determines the accuracy in determination. In a case where the accuracy is equal to or less than a certain level, the determination device outputs and displays the fact of the unclear determination without forcibly outputting an answer. With this configuration, the determination result in a case where an answer is forcibly output with respect to the image having a low accuracy in determination can be excluded from the determination of the number of each type of target (that is, the determination result having a high possibility to be incorrect). In other words, the number of each type of target can be determined only from the image which can be correctly read. As a result, it is possible to recognize the target with accuracy.

DETAILED DESCRIPTION

Figure 1:
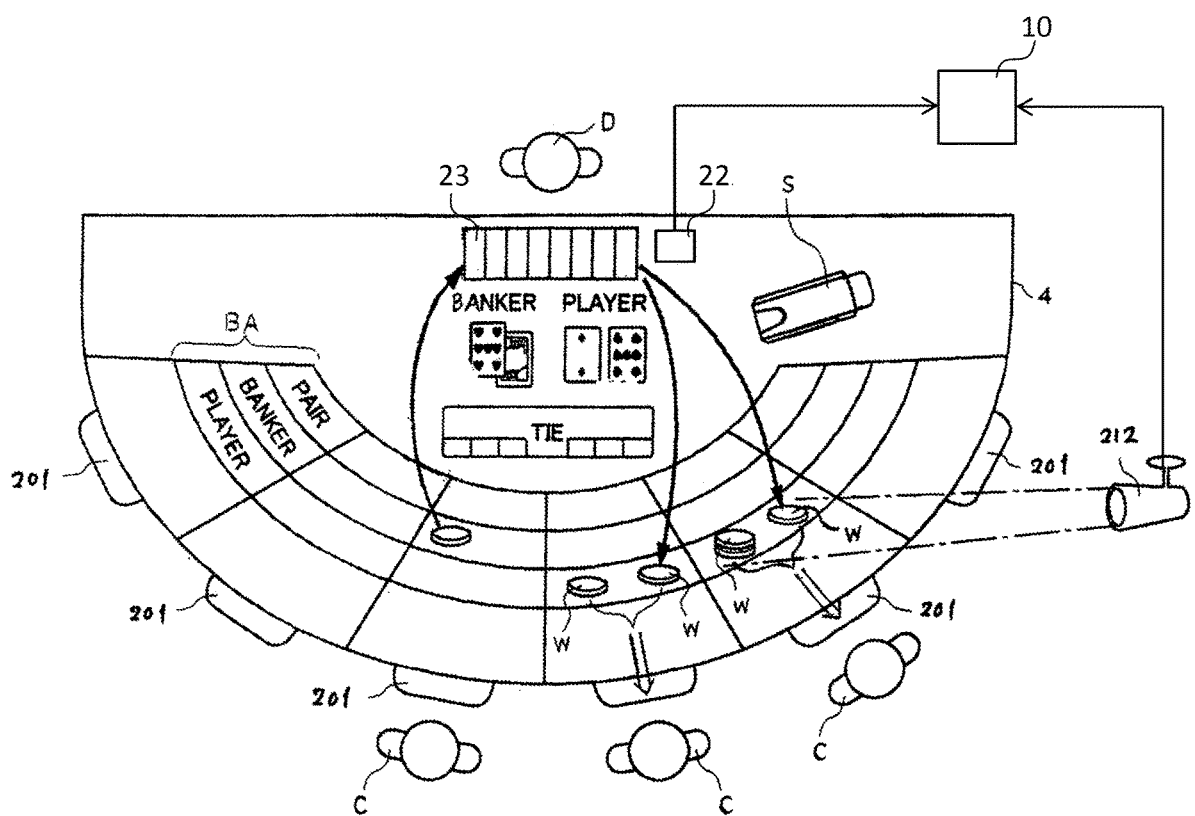
FIG. 1 is a diagram schematically illustrating a game parlor which includes a recognition system of a chip according to an embodiment.

Hereinbelow, embodiments of the invention will be described with reference to the accompanying drawings. Further, the components having the same function will be attached with the same symbol in the drawings, and the redundant description of the components with the same symbol will be omitted.

In the embodiments described below, a recognition system of a chip in a game parlor equipped with a game table will be described as an example of a recognition system which discriminates targets for each type to determine the number of targets for each type. However, it is a matter of course that the determination targets are not limited to chips as long as there are a plurality of types of targets.

First, a game to be played in the game parlor equipped with a game table 4 will be described with reference to FIGS. 1 and 2. In this embodiment, the game table 4 is a baccarat table. The description will be given about an example where a baccarat game is played. However, the invention may be applied even to other game parlors or other games.

Figure 2:
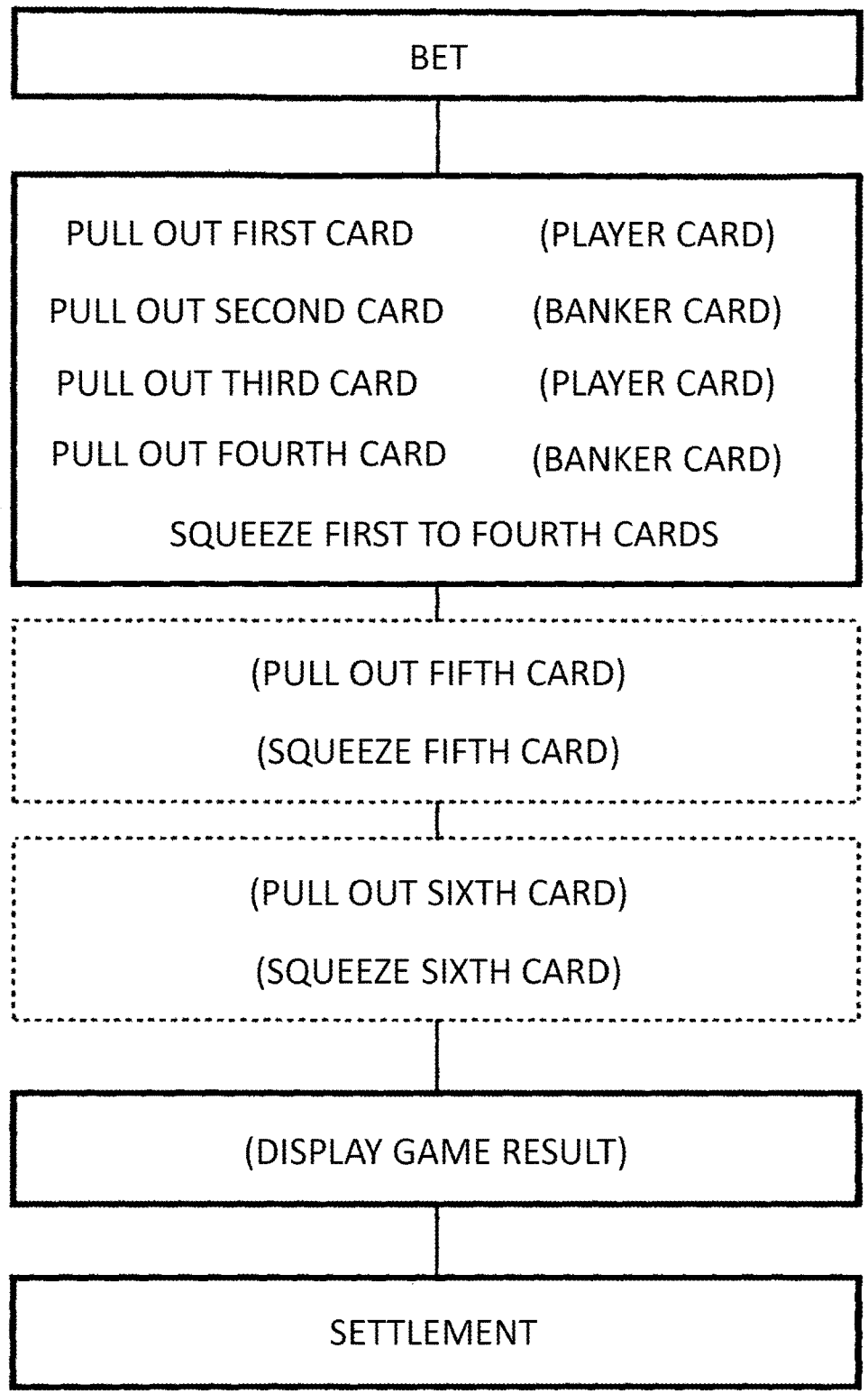
FIG. 2 is a diagram for describing a progress of a baccarat game.

FIG. 1 is a diagram schematically illustrating the game parlor which includes a recognition system 10 of a chip according to an embodiment. As illustrated in FIG. 1, in the game parlor, there are disposed the game table 4 of almost the semi-circular shape and a plurality of chairs 201 which are arranged along the arc side of the game table 4 to face a dealer D. The number of chairs 201 is arbitrary. In the example illustrated in FIG. 1, six chairs 201 are arranged. In addition, bet areas BA are provided on the game table 4 in correspondence to the chairs 201. In other words, in the illustrated example, six bet areas BA are provided to be arranged in an arc shape.

As illustrated in FIG. 1, clients (players) C sit on the chairs 201. The client (player) C stacks and disposes chips W in the bet area BA installed in front of the seated chair 201 on a win/lose result of the baccarat game indicating which one of the player and the banker won or tied (hereinafter referred to as "bet").

The betting chips W may be one type, or may be a plurality of types. In addition, the number of betting chips W may be arbitrarily decided by the client (player) C. The recognition system 10 of the chip according to this embodiment recognizes the number and the type of the stacked chips W.

The dealer D counts timing to close the bet by the client (player) C and calls "No More Bet (close bet)", and moves hands in a horizontal direction. Next, the dealer D pulls out cards one by one from a card shoe device S to the game table 4. As illustrated in FIG. 2, the first card goes to the player, the second card goes to the banker, the third card goes to the player, and the fourth card is distributed to the banker (hereinafter, the pulling out the first to fourth card is referred to as "dealing").

Further, the card is pulled out from the card shoe device S in a state that all the rear surfaces face up. Therefore, the rank (number) and the suit (heart, diamond, space, clover) of the pull-out card is not shown from both the dealer D and the client (player) C.

After the fourth card is pulled out, the client (player) C bet on the player (the client C who bet a highest amount of money in a case where there are a plurality of clients who bet on the player, or the dealer D in a case where there is no client who bet on the player) turns over the first and third cards of which the rear surfaces face up. Similarly, the client (player) C bet on the banker (the client C who bet a highest amount of money in a case where there are a plurality of clients who bet on the banker, or the dealer D in a case where there is no client who bet on the banker) turns over the second and fourth cards (in general, the turning over the reversed card is called "squeeze").

Then, the dealer D pulls out a fifth card and a sixth card on the basis of the ranks (number) of the first to fourth cards and the detailed rules of the baccarat game. These cards are distributed to the player or the banker. Similarly, the client (player) C who bet on the player squeezes the care distributed to the player. The client (player) who bet on the banker squeezes the card went to the banker.

A time taken until the win/lose result is determined after the first to fourth cards are pulled out and the fifth and sixth cards are squeezed is the best time for the client (player) C.

Further, the win/lose may be determined by the first to fourth cards depending on the ranks (numbers) of the cards, or the win/lose result may be determined by the fifth card or the final sixth card. The dealer D confirms that the win/lose is determined and the win/lose result on the basis of the rank (number) of the squeezed card. The dealer D presses a result indicating button of the win/lose in the card shoe device S to display the win/lose result to a monitor for the notification to the client (player) C.

In addition, the win/lose result of the game is determined by a win/lose determination unit of the card shoe device S. If the dealer D tries to pull out a card without displaying the win/lose result even when the win/lose is determined, it will be an error. The card shoe device S detects the error and outputs an error signal. Finally, the dealer D settles the chips bet by the client (player) C during a period when the win/lose result is displayed, pays the chips to the winner client (player) C, and collects the chips from the loser client (player) C. After the settlement is ended, the displaying of the win/lose result is ended, and the betting of the next game starts.

Further, the flow of the baccarat game is widely performed in normal casinos. The card shoe device S is the existing card shoe device which is structured to pull out the card by the hand of the dealer D and is configured to read the pulled-out card. Further, the card shoe device S includes the result indicating button and a result display unit, and has a function of determining the win/lose and of displaying the win/lose result. In the floor of a general casino, there are arranged a plurality of game tables 4. The card shoe device S and a motor are disposed for each game table 4. In each game table 4 or a cabinet therebelow, the card to be used is supplied in unit of packages, sets, or cartons to operate the game.

The recognition system 10 of the chip according to this embodiment relates to a system which recognizes the chips W which is stacked and disposed in the bet area BA by the client (player) C. More specifically, the recognition system 10 relates to a system which recognizes the number and/or the type of the chips W.

As illustrated in FIG. 1, in this embodiment, a monitor camera 212 to capture the state of the chips W stacked and disposed in the bet area BA is provided on the outer side of the game table 4. In addition, an RFID is provided to each of the chips W, and an RFID reading device 22 which reads the RFID of the chip W in a chip tray 23 is provided in the chip tray 23 which is managed by the dealer D.

The recognition system 10 of the chip according to this embodiment is connected to the monitor camera 212 and the RFID reading device 22 to communicate with each other.

Figure 3:
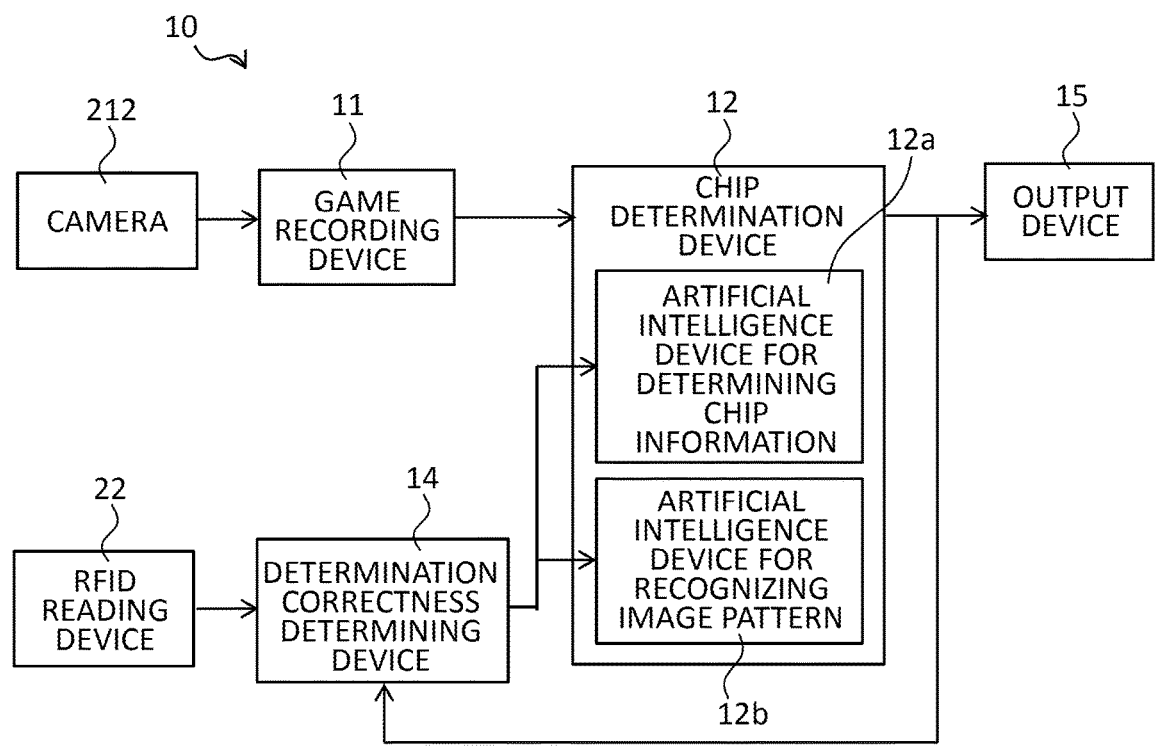
FIG. 3 is a block diagram schematically illustrating a configuration of the recognition system of the chip according to an embodiment.

FIG. 3 is a block diagram schematically illustrating a configuration of the recognition system 10 of the chip according to this embodiment. As illustrated in FIG. 3, the recognition system 10 of the chip has a game recording device 11, a chip determination device 12, and a determination correctness determining device 14. Further, at least part of the recognition system 10 of the chip is realized using a computer.

The game recording device 11 includes, for example, a stationary data storage such as a hard disk. The game recording device 11 records the state of the chips W stacked on the game table 4 as an image which is captured by the camera 212. Further, the image may be a moving image, or may be still images captured continuously.

The game recording device 11 may assign an index or a time to the image acquired from the camera 212, or may assign a tag which specifies a collection scene or a payment scene of the chip W such that the record of the game can be analyzed subsequently by the chip determination device 12 described below.

The chip determination device 12 analyzes the image of the state of the chip W recorded in the game recording device 11, and determines the number and the type of the chip W which is bet by the client (player) C. The chip determination device 12 may include an artificial intelligence device which performs an image recognition by a deep learning technology for example.

By the way, in a case where chips W1 to W6 bet by the client (player) C are stacked in a plurality of piles (see FIG. 5), or in a case where the stacked chips W1 to W6 are stacked in a zigzag (see FIG. 6), all the chips W1 to W6 is not viewed from the camera 212. Therefore, the accuracy in reading the chips W1 to W6 may be lowered.

Figure 5:
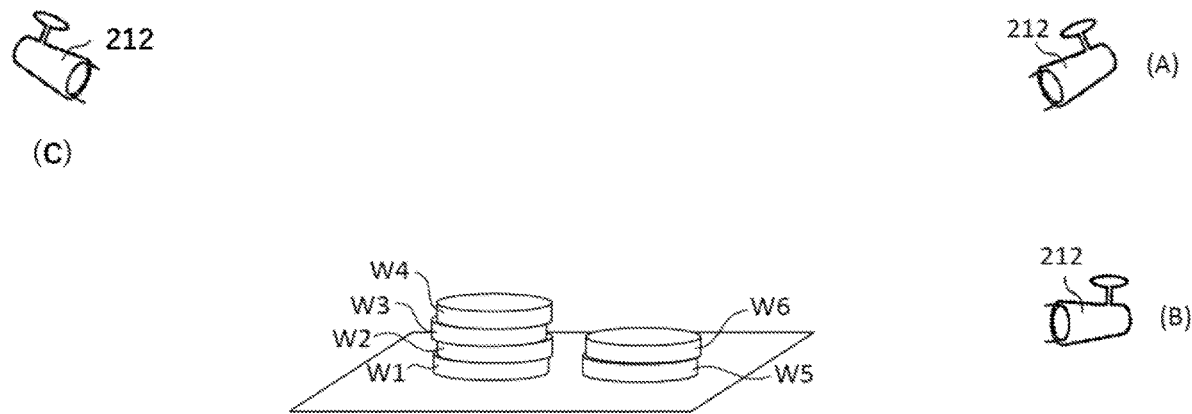
FIG. 5 is a diagram for describing a case where a chip is hidden by another chip.

More specifically, when the height of the camera 212 is increased as the camera 212 illustrated by symbol (A) in FIG. 5, the chips W1 to W4 of the rear pile are hidden by the shadow of the chips W5 and W6 of the front pile even when the chips W1 to W6 are stacked in the front pile and the rear pile. As illustrated by the camera 212 attached with symbol (A) in FIG. 6, in a case where the chips W1 to W6 are randomly stacked in a zigzag, the chip W1 is hidden by the shadow of the chip W2 stacked thereon, the chip W3 is hidden by the shadows of the chips W4 and W5 stacked thereon. Therefore, it is hard to read the chips W1 to W6 all.

Figure 6:
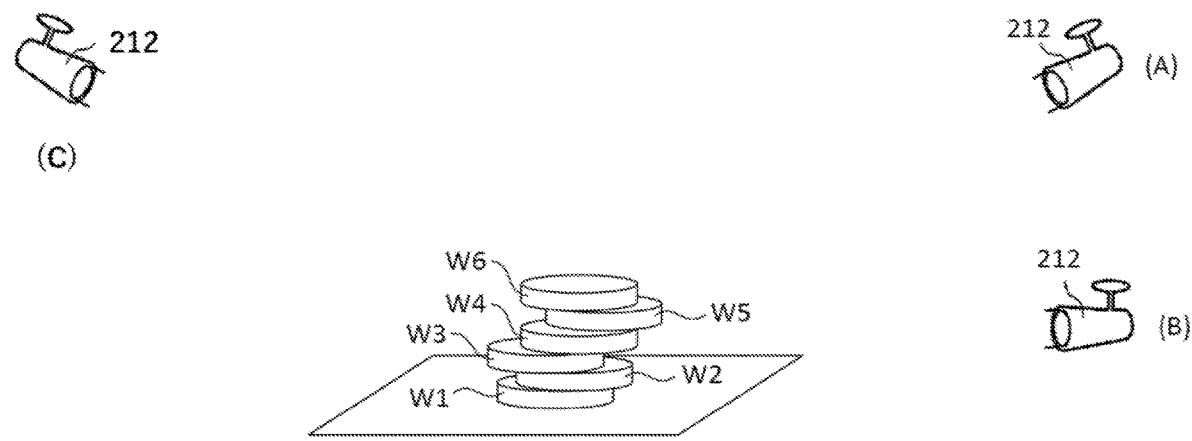
FIG. 6 is a diagram for describing a case where the chips are stacked in a zigzag.

On the contrary, as illustrated by the camera 212 attached with symbol (B) in FIG. 6, when the height of the camera 212 is low, all the chips W1 to W6 are easily read even when the chips W1 to W6 are randomly stacked in a zigzag. However, as illustrated by the camera 212 attached with symbol (B) in FIG. 5, in a case where the chips W1 to W6 are stacked in the front pile and the rear pile, the chips W1 and W2 of the rear pile are easily hidden by the shadows of the chips W5 and W6 of the front pile. Therefore, it is hard to read the chips W1 to W6 all.

In addition, even when there is no problem in the stacking of the chips W1 to W6 but halation (a phenomenon in which an image becomes white due to external light) occurs in the camera 212, the contrast of the image is lowered. Therefore, an accuracy rate of reading the chips W1 to W6 becomes low.

The artificial intelligence device of the related art is forced to output a result even for an image which is less accurate in reading (highly incorrect). Therefore, the chip bet by the client (player) C and the chip of the chip tray are not matched. In a case where the chips are not matched due to an erroneous reading of the artificial intelligence device, the game is necessarily stopped at every time. Therefore, the efficiency is worsened.

In consideration of such a problem, the chip determination device 12 in this embodiment further includes an artificial intelligence device (an artificial intelligence device 12b for recognizing an image pattern) which recognizes a pattern of an image of which the accuracy rate is low (easily mistaken) in addition to the artificial intelligence device which determines the type and the number of the stacked chips W (an artificial intelligence device 12a for determining the chip information).

The artificial intelligence device 12a for determining the chip information analyzes the image of the state of the chip W recorded in the game recording device 11, and determines the number and the type of the chips W bet by the client (player) C. Further, the artificial intelligence device 12a for determining the chip information may determine a position of the chips W bet by the client (player) C on the bet area BA.

The artificial intelligence device 12a for determining the chip information may analyze the image of the state of the chips W recorded in the game recording device 11, and determine the number and the type of the chips W in the chip tray 23 before the game is settled.

As illustrated in FIG. 3, the chip determination device 12 outputs a determination result to an output device 15. The output device 15 may output the determination result of the chip determination device 12 to a monitor on the game table 4 as character information, or may output the determination result to a headset of the dealer D as audio information.

In addition, the artificial intelligence device 12b for recognizing the image pattern stores the characteristics of the image of a predetermined state of the chip W, and determines whether the image acquired from the game recording device 11 is the image of the predetermined state. Herein, the expression "the image of the predetermined state of the chip W" is an image which may have a determination accuracy equal to or lower than a certain level (that is, there is a doubt in determination) in a case where the number and the type of the chips as a result of analyzing the image is determined. Specifically, for example, there is an image which is obtained by capturing the chips W1 to W6 stacked in a plurality of piles using the camera 212 located at a low position (see the camera 212 attached with symbol (B) in FIG. 5), an image which is obtained by capturing the chips W1 to W6 randomly stacked in a zigzag using the camera 212 located at a high position (see the camera 212 attached with symbol (A) in FIG. 6), and an image where halation occurs.

When the image obtained from the game recording device 11 is the image of the predetermined state by the artificial intelligence device 12b for recognizing the image pattern (that is, it is self-determined that the determination accuracy is equal to or less than a certain level), the chip determination device 12 outputs the fact of the unclear determination to the output device 15 as the determination result.

In addition, the chip determination device 12 may have a function of analyzing the image obtained from the game recording device 11 in a case where a self-determination is unclear to determine whether the cause of the unclear determination is (1) the state where the chips stacked on the game table overlap each other or (2) the state where a part of or an entire single chip W is hidden by the other chips.

With reference to FIGS. 5 and 6, in a case where the chip determination device 12 determines that the image obtained from the camera 212 attached with symbol (A) or the camera 212 attached with symbol (B) is an image of the predetermined state and the determination is impossible, the chip W may be read using the image captured by the other camera 212 attached with symbol (C). The chip W can be viewed objectively when viewed at another angle using the camera in a different direction or at a different position. In particular, in a case where the cause of the unclear determination is the fact that a part of or an entire single chip W is hidden by the other chips as illustrated in FIG. 5, the chips are not hidden by the other chips when the camera 212 on the opposite side which is attached with symbol (C) is used. Further, the chip determination device 12 may output the read results of the chips W which are obtained using the images captured by the cameras 212. In that case, the chip determination device 12 may output the determination accuracies of the read results together. A result showing the largest read times may be recognized as the image which has a high possibility of correct recognition.

When the chips W are counted, the chip determination device 12 may determine that the chips are not possible to be counted in a case where the next chip W is recognized while a certain number of chips or more are not recognized in the vertical direction in the pile of the chips W. In other words, in a case where the next chip W is recognized while a certain number of chips or more are not recognized in the vertical direction, it is highly possible that the chips are hidden in the midst and not visible.

The chip determination device 12 compares the number of chips W determined from the height of the chips W with the result obtained when the type and the number of the chips W are determined. In a case where the determination results of the number are different, the chip determination device 12 may output a determination result indicating that the determination is impossible. The number of the chips may be determined by a triangulation method after determine a specific point (the center of the outline of the uppermost chip) from the shape of the chips.

The determination correctness determining device 14 is a device which determines whether the determination result of the chip determination device 12 is correct. When the settlement of the chips bet by the client (player) C is ended (that is, the payment to the winner client (player) C and the collection of the chips W (lost chips) bet by the loser client (player) C are ended), the determination correctness determining device 14 grasps a real total amount V0 of the chips W in the chip tray 23.

In this embodiment, the determination correctness determining device 14 acquires RFID information of the chip W in the chip tray 23 from the RFID reading device 22. The determination correctness determining device 14 determines the type and the number of the chips W in the chip tray 23 after each game is settled on the basis of the acquired RFID information, and grasps the real total amount V0.

In addition, the determination correctness determining device 14 acquires the information of the number and the type of the chips W as the determination result from the chip determination device 12. The determination correctness determining device 14 calculates a total amount (that is, a reduction amount of the chip tray 23 in the game) V2 of the chips W (won chips) bet by the winner client (player) C and a total amount (that is, an increase amount of the chip tray 23 in the game) V3 of the chips W bet by the loser client (player) C on the basis of the information of the acquired chip W. Then, the determination correctness determining device 14 subtracts the reduction amount V2 of the chip tray 23 in the game from a total amount V1 of the chips W in the chip tray 23 before the settlement of each game, and adds the increase amount V3 of the chip tray 23 in the game so as to calculate a total amount V4 (=V1−V2+V3) of the chips in the chip tray 23.

The determination correctness determining device 14 compares the total amount V4 of the chips W in the chip tray 23 and the real total amount V0 of the chips W in the chip tray 23. When there is a difference between the total amount V4 and the real total amount V0 (V4≠V0), it is determined that there is an error in the determination result of the chip determination device 12. On the other hand, when the total amount V4 and the real total amount V0 are matched (V4=V0), the determination correctness determining device 14 determines that the determination result of the chip determination device 12 is correct.

The chip determination device 12 acquires whether the determination result of the chip determination device 12 is correct from the determination correctness determining device 14. In a case where the determination correctness determining device 14 determines that the determination result of the chip determination device 12 is correct, the artificial intelligence device 12a for determining the chip information learns, as training data, an image used in the past (correct) determination in a case where the determination is correct and the information about the number and the type of the chips W as the (correct) determination result. Repeating the learning, the artificial intelligence device 12a for determining the chip information can increase the determination accuracy of the number and the type of the chips W.

On the other hand, in a case where the determination correctness determining device 14 determines that there is an error in the determination result of the chip determination device 12, the artificial intelligence device 12b for recognizing the image pattern learns an image used in the past (erroneous) determination in a case where there is an error in the determination as the training data of "the image of the predetermined state". A person may chose an image of a predetermined state (an image of a chip hidden by the shadow of another chip, an image of a chip stacked in a zigzag, and an image causing halation), and cause the artificial intelligence device 12b for recognizing the image pattern to learn the image. A person or an artificial intelligence may intentionally create an image of a predetermined state (an image of a chip hidden by the shadow of another chip, an image of a chip stacked in a zigzag, and an image causing halation), and cause the artificial intelligence device 12b for recognizing the image pattern to learn the image. Repeating the learning, the artificial intelligence device 12b for recognizing the image pattern can accurately extract an image which has a possibility that the determination accuracy becomes equal to or less than a certain level. In other words, it is possible to increase the accuracy of the self-determination when the determination accuracy is subjected to the self-determination.

Next, an example of the operation of the recognition system 10 of the chip according to this embodiment (a recognition method of the chip) will be described with reference to FIG. 4.

Figure 4:
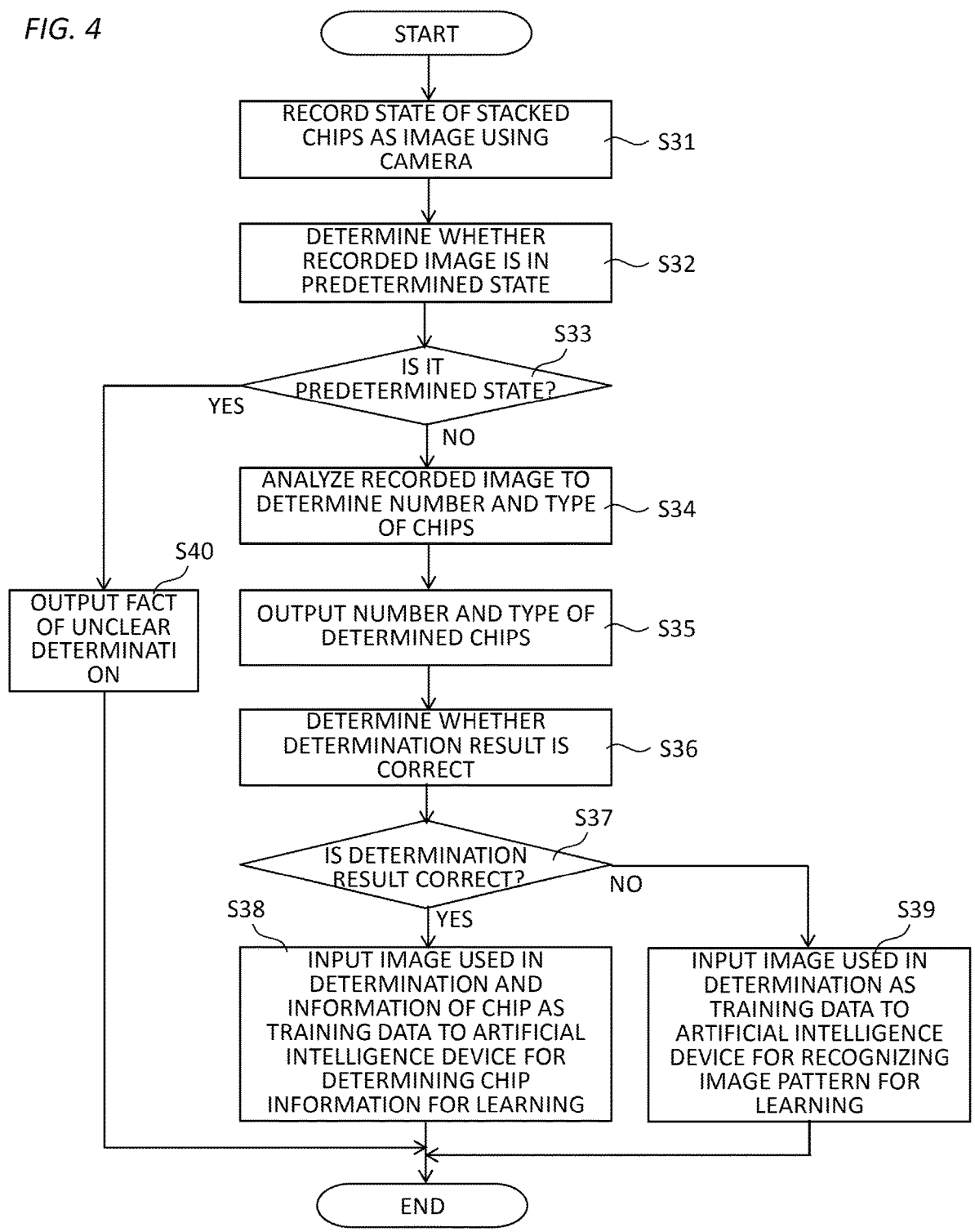
FIG. 4 is a flowchart for describing a recognition method of the chip according to an embodiment.

As illustrated in FIG. 4, first, when the chips W are stacked and disposed in the bet area BA of the game table 4 by the client (player) C (the chip W is bet), the game recording device 11 captures and restores the state of the stacked chips Was an image of the camera 212 (Step S31).

Next, the chip determination device 12 acquires the image recorded in the game recording device 11. Further, the image acquired by the chip determination device 12 may be selected on the basis of an index, a time, or a tag to specify a collection scene or a payment scene of the chips W which are assigned to the image by the game recording device 11.

In the chip determination device 12, the artificial intelligence device 12b for recognizing the image pattern determines whether the image obtained from the game recording device 11 is the image of the predetermined state (Step S32). More specifically, the artificial intelligence device 12b for recognizing the image pattern learns a plurality of images used in the past determination in a case where the chip determination device 12 determines that there is an error as the training data as described above. The artificial intelligence device 12b performs the self-determination on the determination accuracy of the chip W and determines whether the determination accuracy is equal to or less than a certain level on the basis of the image which has an error in the determination result as a result of the learning.

In a case where the artificial intelligence device 12b for recognizing the image pattern determines that the image obtained from the game recording device 11 is the image of the predetermined state (Step S33: YES), the chip determination device 12 outputs the fact of the unclear determination to the output device 15 as the determination result (Step S40). The determination result of the chip determination device 12 may be output to a monitor on the game table 4 as character information by the output device 15, or may be output to a headset of the dealer D as audio information.

On the other hand, in a case where the artificial intelligence device 12b for recognizing the image pattern determines that the image obtained from the game recording device 11 is not the image of the predetermined state (Step S33: NO), the artificial intelligence device 12a for determining the chip information analyzes the image of the state of the chips W recorded in the game recording device 11 to determine the number and the type of the chips W bet by the client (player) C (Step S34).

Further, in Step S34, the chip determination device 12 may determine a position on the bet area BA of the chips W bet by the client (player) C, or may determine the number and the type of the chips W in the chip tray 23 before the settlement of each game in addition to the analysis of the image of the state of the chips W recorded in the game recording device 11 to determine the number and the type of the chips W bet by the client (player) C.

The information of the number and the type of the chips W determined by the chip determination device 12 is output to the output device 15 (Step S35). The determination result of the chip determination device 12 may be output to a monitor on the game table 4 as character information by the output device 15, or may be output to a headset of the dealer D as audio information.

The information of the number and the type of the chips W determined by the chip determination device 12 is also input to the determination correctness determining device 14. The determination correctness determining device 14 determines whether the determination result of the chip determination device 12 is correct (Step S36).

In a case where the determination correctness determining device 14 determines that the determination result of the chip determination device 12 is correct (Step S37: YES), the image used in the (correct) determination of the chip determination device 12 and the information of the number and the type of the chips W as the (correct) determination result are input to the artificial intelligence device 12a for determining the chip information as the training data, and the artificial intelligence device 12a for determining the chip information performs learning (Step S38).

On the other hand, in a case where the determination correctness determining device 14 determines that the determination result of the chip determination device 12 is wrong (Step S37: NO), the image used in the (erroneous) determination of the chip determination device 12 is input to the artificial intelligence device 12b for recognizing the image pattern as the training data of "the image of the predetermined state," and the artificial intelligence device 12b for recognizing the image pattern performs learning (Step S39).

The artificial intelligence makes a big mistake in the determination result in a case where there is an error (to make a wrong answer too confidently). The artificial intelligence is set to learn the patterns of the images which are easily mistaken, so that the patterns of the images easily mistaken can be recognized.

As described above, according to this embodiment, the chip determination device 12 stores the image having a low reading accuracy of the chip W as the image of the predetermined state. When the image obtained from the game recording device 11 is determined as the image of the predetermined state, the chip determination device 12 outputs and displays the fact of the unclear determination without forcibly outputting an answer. With this configuration, it is possible to exclude the determination result in a case where an answer is forcibly output with respect to the image having a low reading accuracy of the chip W from the determination result of the number and the type of the chips W (that is, the determination result having a high possibility to be incorrect). In other words, the number and the type of the chips W can be determined only from the image which can be accurately read. As a result, it is possible to recognize the chips W with accuracy.

In other words, for example, in a case where the accuracy rate is 99.9% when 1,000 images are determined by the chip determination device 12, 9 out of 10 images (0.1% mistaken images) are the chips hidden by the shadow or by stacking in a zigzag, and the accuracy rate is low. The accuracy rate can be increased further more by excluding such cases from denominator.

In addition, according to this embodiment, the artificial intelligence device 12b for recognizing the image pattern learns a plurality of images used in the past (erroneous) determination when there is an error in determination as the training data, so that it is possible to increase the accuracy in the self-determination when the determination accuracy is self-determined. With this configuration, it is possible to reduce a situation that an image which can be read originally correctly is erroneously output and displayed as an unclear determination.

In addition, according to this embodiment, in a case where a self-determination is unclear, the chip determination device 12 determines whether a cause of the unclear determination is (1) a state where the chips W stacked on the game table 4 overlap each other, or (2) a state where a part of or an entire single chip W is hidden by the other chips W, and stores the cause. Therefore, the dealer D can easily recognize the cause of the unclear determination. With this configuration, the dealer D can quickly eliminate the cause of the unclear determination by replacing the chips W at positions not shadowing the other chips W or by clearly stacking the chips W stacked in a zigzag (the dealer D may call attention to the client (player) C when the client (player) C does not like the dealer D touch the chips W).

In addition, according to this embodiment, the game recording device 11 assigns an index or a time to the image acquired from the camera 212 or assigns and records a tag to specify the stacking state of the chips W. Therefore, the chip determination device 12 uses the index, the time, and the tag assigned to the image to easily specify the image of the state of the analysis target and the chips W from the recorded content of the game recording device 11. Thus, it is possible to reduce time required to the specification.

In addition, according to this embodiment, the artificial intelligence device 12a for determining the chip information learns the plurality of images used in the past (correct) determination in a case where the chip determination device 12 makes a correct determination and the information of the chips W as the (correct) determination result as the training data. Therefore, it is possible to increase the determination accuracy when the number and the type of the chips W are determined.

Further, the above-described embodiments are described for the purpose that persons who have common knowledge in the technical field to which the inventions pertains can work the invention. Various modifications of the embodiments may be carried out by a person skilled in the art, the technical ideas of the invention may be applied to other embodiments. Therefore, the invention is not limited to the embodiments described above, but shall be understood to the widest scope according to the technical ideas defined in claims.

What is claimed is:

1. A recognition system of a chip in a game parlor where a game table is provided, the recognition system comprising:
   a game recording device configured to record a state of chips stacked on the game table as an image captured by a camera diagonally from above the game table, wherein the game recording device is configured to assign a tag to the image, the tag specifying the state of the chips; and
   a chip determination device configured to use an artificial intelligence to analyze the image of the state of the chips to make a determination of a number and a type of the chips bet by a player based at least in part on the tag,
   wherein the chip determination device further has a function of self-determining an accuracy of the determination of the number and the type of the chips,
   wherein the chip determination device is further configured to, if the accuracy is equal to or less than a threshold level, display an indicator of an unclear determination as a determination result of the function.

2. The recognition system of the chip according to claim 1, wherein:
   the chip determination device includes an artificial intelligence device, the artificial intelligence device configured to learn a plurality of images as training data, each image of the plurality of images used in a past determination in a case where there is an error in determination by the chip determination device.

3. The recognition system of the chip according to claim 2, wherein:
   the chip determination device further has a function of analyzing the image of the game recording device in a case where the self-determination is unclear, determining whether a cause of the unclear determination is the state in which the chips stacked on the game table overlap each other or a part of or an entire single chip is hidden by other chips, and
   the chip determination device is further configured to store the cause.

4. The recognition system of the chip according to claim 1, wherein the game recording device is configured to assign an index or a time to the image acquired from the camera, such that the image can be analyzed subsequently by the chip determination device based at least in part on the index or the time.

5. The recognition system of the chip according to claim 1, wherein the chip determination device includes a second artificial intelligence device, and the second artificial intelligence device is configured to learn a plurality of images as training data, each image of the plurality of images used in a past determination in a case where the chip determination device made a correct determination of the chip.

6. The recognition system of the chip according to claim 1, wherein the chip determination device is configured to analyze an image recorded by another camera that is different from the camera in a case where a self-determination by the chip determination device, and based on the image of the camera, is unclear to determine the number and the type of the chips bet by the player.

7. The recognition system of the chip according to claim 1, wherein the chip determination device is configured to, based on analysis of the image, in a case where a chip of the chips is recognized while a threshold number or more of other chips of the chips, in a vertical direction with respect to the chip that is recognized, are not recognized, output or display an indicator of the unclear determination as the determination result.

8. The recognition system of the chip according to claim 1, wherein the chip determination device is configured to:
compare a number of chips determined from a height of the chips and a number determined by analyzing the image, and
in a case where the numbers are different:
determine that the image includes the state of the chips, and
output and display the indicator of the unclear determination as the determination result.

9. A recognition system comprising:
a recording device configured to record, using a camera, a state of an image captured by a camera diagonally from above a game table, the image including a target, wherein the recording device is configured to assign a tag to the image, the tag specifying the state of the target; and
a determination device including an artificial intelligence device configured to analyze the image to determine, for each determination target type of a plurality of determination target types, a number of determination targets having the target type, based at least in part on the tag,
wherein the determination device has learnt a past determination result as training data and has:
a function of self-determining an accuracy in a determination of the artificial intelligence device based on analyzing the image, and
a function of:
self-determining that there is a doubt in the determination based on the accuracy less than or equal to a threshold level, and
outputting and displaying an indicator of an unclear determination as a determination result of the artificial intelligence device.

* * * * *